(12) United States Patent
Taki (10) Patent No.: US 12,460,591 B2
(45) Date of Patent: Nov. 4, 2025

(54) ENGINE CONTROL DEVICE OF INDUSTRIAL VEHICLE

(71) Applicant: KABUSHIKI KAISHA TOYOTA JIDOSHOKKI, Kariya (JP)

(72) Inventor: Yasuhiro Taki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/639,094

(22) PCT Filed: Aug. 25, 2020

(86) PCT No.: PCT/JP2020/031909
§ 371 (c)(1),
(2) Date: Feb. 28, 2022

(87) PCT Pub. No.: WO2021/044892
PCT Pub. Date: Mar. 11, 2021

(65) Prior Publication Data
US 2022/0298981 A1    Sep. 22, 2022

(30) Foreign Application Priority Data
Sep. 4, 2019   (JP) .................................. 2019-161525

(51) Int. Cl.
*B60W 10/06*     (2006.01)
*B62D 5/06*      (2006.01)
(Continued)

(52) U.S. Cl.
CPC ............. *F02D 29/04* (2013.01); *B62D 5/063* (2013.01); *B62D 5/07* (2013.01); *F02D 41/042* (2013.01); *B60W 10/06* (2013.01); *F02D 2200/60* (2013.01)

(58) Field of Classification Search
CPC .... F02D 29/04; F02D 41/042; F02D 2200/60; B62D 5/063; B62D 5/07
See application file for complete search history.

(56) References Cited

U.S. PATENT DOCUMENTS 4,079,806 A * 3/1978 Hoag ....................... B62D 5/06
                                                            180/406
7,516,810 B2    4/2009 Miura et al.
(Continued)

FOREIGN PATENT DOCUMENTS

EP          1659279 B1      9/2007
JP          53-026026 A     3/1978
(Continued)

OTHER PUBLICATIONS

Extended European Search Report dated Sep. 14, 2022 from the European Patent Office in EP Application No. 20860599.8.
(Continued)

*Primary Examiner* — Gonzalo Laguarda
(74) *Attorney, Agent, or Firm* — Sughrue Mion, PLLC (57) ABSTRACT

An engine control device for an industrial vehicle includes a seating detector configured to detect a seating state of a driver relative to a driver seat, a neutral detector configured to detect whether a direction operating member of the industrial vehicle is positioned in a neutral position, a fuel supply member configured to supply a fuel to the engine, a first controller configured to stop an output of a driving force from the engine when the seating detector detects that the driver is away from the driver seat, and a second controller configured to restart the output of the driving force from the engine in case that the seating detector detects that the driver is seated on the driver seat and the neutral detector detects that the direction operating member is positioned in the
(Continued)

neutral position, after the first controller stops the output of the driving force from the engine.

4 Claims, 7 Drawing Sheets

(51) Int. Cl.
*B62D 5/07* (2006.01)
*F02D 29/04* (2006.01)
*F02D 41/04* (2006.01)

(56) References Cited

U.S. PATENT DOCUMENTS

| | | | | |
|---|---|---|---|---|
| 10,081,361 | B2* | 9/2018 | Books | B60R 16/03 |
| 10,760,542 | B2* | 9/2020 | Enomoto | F02N 11/0844 |
| 2010/0057332 | A1* | 3/2010 | Katoh | F02N 11/0803 |
| | | | | 701/113 |

FOREIGN PATENT DOCUMENTS

| | | |
|---|---|---|
| JP | 63-251329 A | 10/1988 |
| JP | 01-155037 A | 6/1989 |
| JP | 01-179031 U | 12/1989 |
| JP | 09-158753 A | 6/1997 |
| JP | 2000-104291 A | 4/2000 |
| JP | 2000-318481 A | 11/2000 |
| JP | 2001-182572 A | 7/2001 |
| JP | 2004-190636 A | 7/2004 |
| JP | 2005-170600 A | 6/2005 |
| JP | 2005-325843 A | 11/2005 |
| JP | 2006-316942 A | 11/2006 |
| JP | 2011-017272 A | 1/2011 |
| JP | 2013-185622 A | 9/2013 |
| JP | 2015048723 A | 3/2015 |

OTHER PUBLICATIONS

Examination Report dated Apr. 12, 2023 from the Canadian Intellectual Property Office in CA Application No. 3,152,177.
Communication dated Oct. 10, 2024 in European Application No. 20 860 599.8.
Communication issued May 27, 2025 in Brazilian Application No. BR112022003115-7.

* cited by examiner

ENGINE CONTROL DEVICE OF INDUSTRIAL VEHICLE

CROSS REFERENCE TO RELATED APPLICATION

This application is a National Stage of International Application No. PCT/JP2020/03190f9 filed Aug. 25, 2020, claiming priority based on Japanese Patent Applications No. 2019-161525 filed Sep. 4, 2019, the contents of all of which are incorporated herein by reference in their entirety.

TECHNICAL FIELD

The present disclosure relates to an engine control device of an industrial vehicle.

BACKGROUND ART

As an engine control device for an industrial vehicle, for example, a technique disclosed in Patent Document 1 has been known. The engine control device disclosed in Patent Document 1 is provided with a seat switch that detects whether or not a driver is seated on a driver seat of a vehicle for work, a key switch corresponding to a main power switch of the vehicle for work, and an ECU. The ECU stops an engine when it is determined by the seat switch that the driver is away from the driver seat while the vehicle for work is travelling, and then allows the engine to be activated when the driver turns the key switch OFF.

CITATION LIST

Patent Document

[Patent Document 1] Japanese Patent Application Publication No. 2000-318481

SUMMARY OF INVENTION

Technical Problem

There is an industrial vehicle that can actuate a power-steering assistance by operating a power-steering actuator with hydraulic oil from a hydraulic pump driven by an engine. In this industrial vehicle, once the driver is away from the driver seat, the engine is kept stopped until the key switch is switched from OFF to ON, and thus, the power-steering assistance cannot be actuated.

An object of the present disclosure is to provide an engine control device for an industrial vehicle that can continuously provide a power-steering assistance even when a driver is away from a driver seat temporarily.

Solution to Problem

According to one aspect of the present disclosure an engine control device for an industrial vehicle in which a power-steering actuator is actuated by hydraulic oil from hydraulic pump driven by an engine includes: a seating detector configured to detect a seating state of a driver relative to a driver seat of the industrial vehicle; a neutral detector configured to detect whether or not a direction operating member of the industrial vehicle is positioned in a neutral position; a first controller configured to stop an output of a driving force from the engine when the seating detector detects that the driver is away from the driver seat; and a second controller configured to restart the output of the driving force from the engine, in case that the seating detector detects that the driver is seated on the driver seat and the neutral detector detects that the direction operating member is positioned in the neutral position, after the first controller stops the output of the driving force from the engine.

In this engine control device, an output of a driving force from the engine stops when it is detected that the driver is away from the driver seat. Then, the engine rotates by inertia, and the rotation speed of the engine is reduced gradually. After that, when it is detected that the driver is seated on the driver seat and that the direction operating member is positioned in the neutral position, the output of the driving force from the engine restarts. Therefore, even when the output of the driving force from the engine is stopped with the driver away from the driver seat, the output of the driving force from the engine is restarted if the driver is seated on the driver seat and operates the direction operating member to be positioned in the neutral position before the rotation of the engine stops completely. As a result, the hydraulic pump continues to supply hydraulic oil to the power-steering actuator. This allows the power-steering assistance to be provided continuously even if the driver is away from the driver seat temporarily.

The engine control device may further include a fuel supply member configured to supply a fuel to the engine, wherein the first controller controls the fuel supply member so as to stop a supply of the fuel to the engine when the seating detector detects that the driver is away from the driver seat, and the second controller may control the fuel supply member so as to restart the supply of the fuel to the engine when the seating detector detects that the driver is seated on the driver seat and the neutral detector detects that the direction operating member is positioned in the neutral position. This configuration allows the output of the driving force from the engine to be stopped and restarted easily and reliably by stopping and restarting a supply of fuel from the fuel supply member to the engine.

The engine control device may further include a relay disposed between the fuel supply member and a battery, wherein the first controller controls the fuel supply member via the relay so as to stop the supply of the fuel to the engine when the seating detector detects that the driver is away from the driver seat, and the second controller controls the fuel supply member via the relay so as to restart the supply of the fuel to the engine when the seating detector detects that the driver is seated on the driver seat and the neutral detector detects that the direction operating member is positioned in the neutral position. In this configuration, in a case a relay that is opened when an electric current flows is used, the relay is opened even if a controller forming the first controller and the second controller breaks down and the fuel supply member is energized, so that the fuel supply member may supply fuel to the engine. In this case, since the stop of the engine is suppressed, the industrial vehicle can be moved to a safe place.

The first controller may be configured to stop an output of a driving force from the engine when the seating detector detects that the driver is away from the driver seat for a predetermined period of time. In this configuration, in a case where the driver is away from the driver seat for an extremely short period of time, the output of the driving force from the engine does not stop, so that the workability may be improved.

The second controller may be configured to issue a warning when the seating detector detects that the driver is seated on the driver seat and the neutral detector detects that the direction operating member is positioned in a position other than the neutral position. In this configuration, a warning is issued when the driver is seated on the driver seat and the direction operating member is positioned in the position other than the neutral position, after the output of the driving force from the engine is stopped. Therefore, the driver may be notified that a state in which the output of the driving force from the engine is stopped is continuing.

Advantageous Effects of Invention

According to the present disclosure, a power-steering assistance may be continuously provided even if a driver is away from a driver seat temporarily.

DESCRIPTION OF EMBODIMENTS

Hereinafter, embodiments of the present disclosure will be described in detail with reference to the accompanying drawings. In the drawings, the same or equivalent components are designated by the same reference numerals, and the redundant descriptions thereof are omitted.

Figure 1:
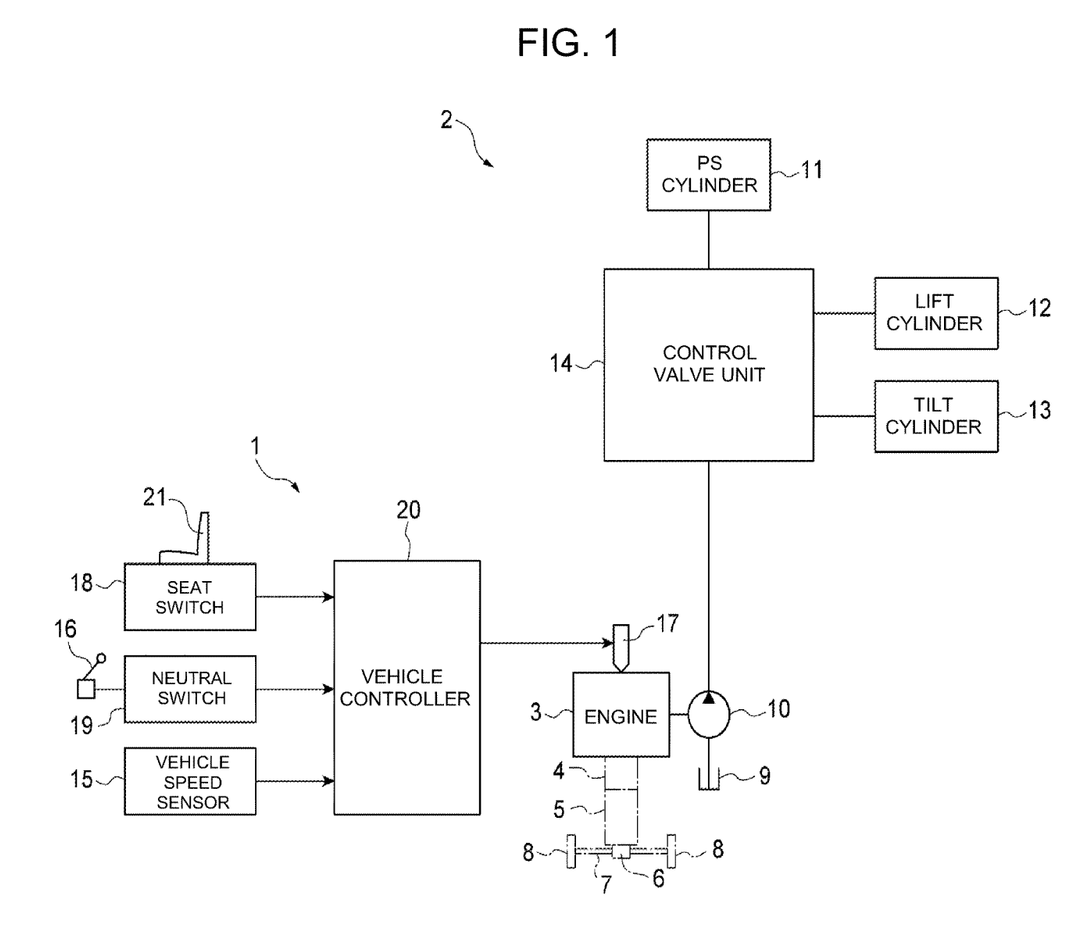
FIG. 1 is a schematic configuration view, illustrating an industrial vehicle provided with an engine control device according to a first embodiment of the present disclosure.

FIG. 1 is a schematic configuration view, illustrating an industrial vehicle provided with an engine control device according to a first embodiment of the present disclosure. In FIG. 1, an engine control device 1 of the present embodiment is mounted on a forklift 2 of an engine type corresponding to the industrial vehicle.

The forklift 2 includes an engine 3, a transmission 5 connected to an output shaft of the engine 3 via a torque converter 4, and paired right and left driving wheels 8 connected to the transmission 5 via a speed reducer 6 and an axle shaft 7.

The engine 3 may be a gasoline engine or a diesel engine. The engine 3 generates a driving force by burning fuel. The driving force generated by the engine 3 is mechanically transmitted to the driving wheels 8 through the torque converter 4, the transmission 5, the speed reducer 6, and the axle shaft 7, thereby rotating the driving wheels 8. As a result, the forklift 2 travels.

The forklift 2 includes a tank 9 storing hydraulic oil, a hydraulic pump 10 discharging hydraulic oil stored in the tank 9, a power-steering cylinder 11 (a power-steering actuator) operated with the hydraulic oil discharged by the hydraulic pump 10, a lift cylinder 12, a tilt cylinder 13, and a control valve unit 14.

The hydraulic pump 10 is rotatably driven by the driving force outputted from the engine 3. The power-steering cylinder 11 is a hydraulic cylinder for providing an assistance for steering of a steering wheel (not illustrated) (hereinafter, referred to as the power-steering assistance). The lift cylinder 12 is a hydraulic cylinder for causing a pair of forks (not illustrated) mounted to a mast (not illustrated) to move up and down. The tilt cylinder 13 is a hydraulic cylinder for causing the mast to tilt. The control valve unit 14 is configured to control a flow of hydraulic oil supplied to the power-steering cylinder 11, the lift cylinder 12, and the tilt cylinder 13 from the hydraulic pump 10.

The forklift 2 is provided with a vehicle speed sensor 15, and a direction lever 16 (a direction operating member). The vehicle speed sensor 15 is a sensor configured to detect a vehicle speed of the forklift 2.

The direction lever 16 is an operating lever for operating the transmission 5 to be switched to any one of forward, reverse, or neutral gears. When the direction lever 16 is in a neutral position, the transmission 5 does not mechanically transmit the driving force outputted from the engine 3 to the driving wheels 8. When the direction lever 16 is in a forward position or a reverse position, the transmission 5 mechanically transmits the driving force outputted from the engine 3 to the driving wheels 8.

The engine control device 1 is a device configured to control the engine 3. The engine control device 1 includes an injector 17, a seat switch 18, a neutral switch 19, and a vehicle controller 20.

The injector 17 is a fuel injection valve configured to inject fuel towards a combustion chamber (not illustrated) inside the engine 3. The injector 17 is attached to a cylinder head of the engine 3. The injector 17 includes a control solenoid 17a (see FIG. 2) to which an electric signal from the vehicle controller 20 is inputted. The injector 17 corresponds to a fuel supply member configured to supply fuel to the engine 3.

The seat switch 18 corresponds to a seating detector configured to detect a seating state of a driver (operator) relative to a driver seat 21 of the forklift 2, i.e., the driver being away from the driver seat or the driver being seated on the driver seat. It is noted that the driver being away from the driver seat as used herein means that the driver seated on the seat of the driver seat 21 stands up and is away from the driver seat 21 for a short period of time (for example, several seconds). The neutral switch 19 corresponds to a neutral detector configured to detect whether or not the direction lever 16 is positioned in the neutral position.

The vehicle controller 20 is a microcomputer having a CPU, a RAM, a ROM, an input-output interface, and the like. The vehicle controller 20 receives detection signals from the vehicle speed sensor 15, the seat switch 18, and the neutral switch 19, and executes a predetermined processing, thereby controlling the injector 17.

Figure 2:
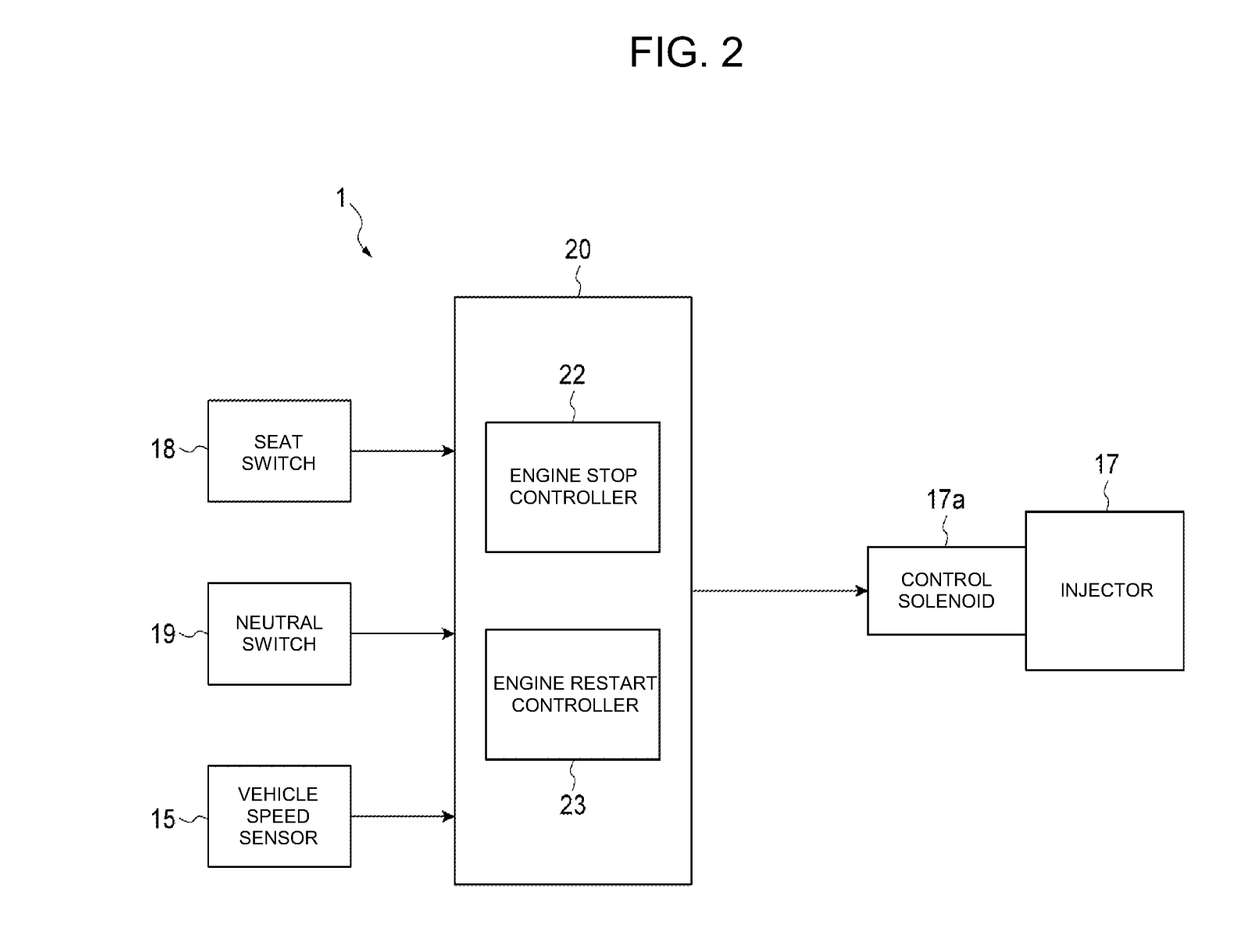
FIG. 2 is a block diagram, illustrating a configuration of a control system of the engine control device illustrated in FIG. 1.

FIG. 2 is a block diagram illustrating a configuration of a control system of the engine control device 1. In FIG. 2, the vehicle controller 20 includes an engine stop controller 22, and an engine restart controller 23.

The engine stop controller 22 forms a first controller configured to stop the output of the driving force from the engine 3 by controlling the control solenoid 17a of the injector 17 so as to stop fuel injection from the injector 17 when the seat switch 18 detects that the driver is away from the driver seat 21.

The engine restart controller 23 forms a second controller configured to restart the output of the driving force from the engine 3 by controlling the control solenoid 17*a* so as to restart fuel injection from the injector 17, in case that the seat switch 18 detects that the driver is seated on the driver seat 21 and the neutral switch 19 detects that the direction lever 16 is positioned in the neutral position, after the engine stop controller 22 stops the output of the driving force from the engine 3.

Figure 3:
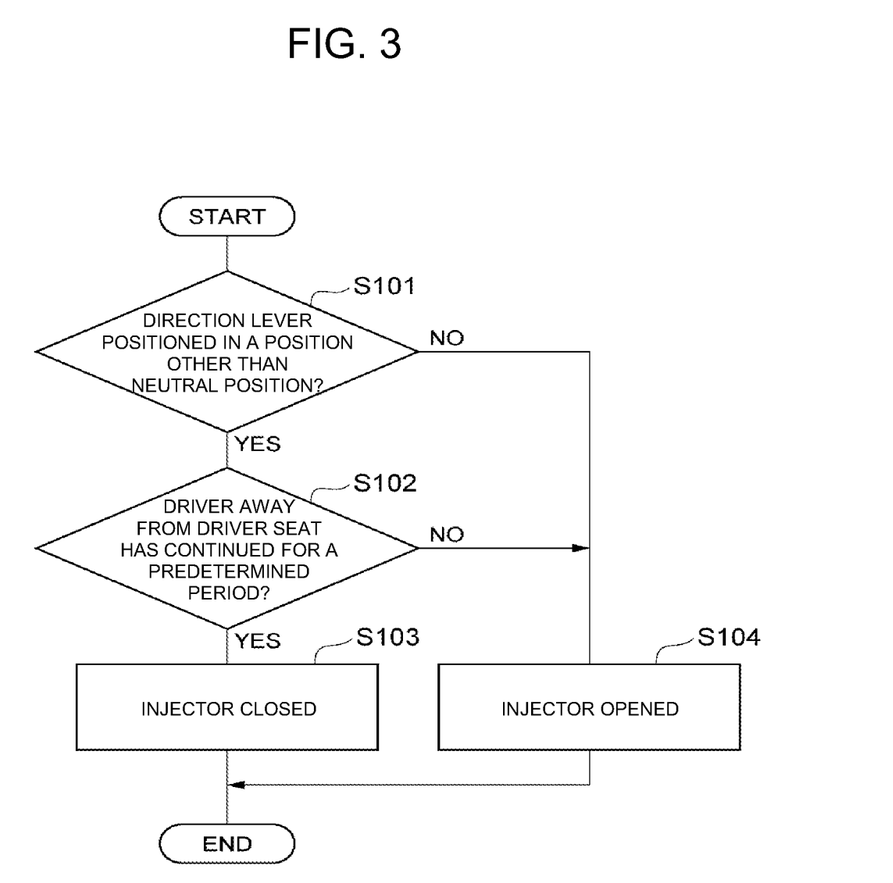
FIG. 3 is a flowchart, showing details of an engine stop control process executed by an engine stop controller illustrated in FIG. 2.

FIG. 3 is a flowchart, showing details of an engine stop control process executed by the engine stop controller 22.

In FIG. 3, the engine stop controller 22, firstly, determines whether or not the direction lever 16 is positioned in a position other than the neutral position (the forward position or the reverse position) based on a detection signal from the neutral switch 19 (Step S101).

When it is determined that the direction lever 16 is positioned in a position other than the neutral position, the engine stop controller 22 determines whether or not a state in which the driver is away from the driver seat 21 has continued for a predetermined period of time, based on the detection signal from the seat switch 18 (Step S102). The predetermined period of time is, for example, about 2 seconds.

When it is determined that the state in which the driver is away from the driver seat 21 has continued for the predetermined period of time, the engine stop controller 22 controls the control solenoid 17*a* so that the injector 17 is closed (Step S103). In other words, when it is determined that the driver is away from the driver seat 21 by the engine stop controller 22 and the seat switch 18, the engine stop controller 22 controls the injector 17 so as to stop a supply of fuel to the engine 3. At this time, the engine stop controller 22 outputs an OFF signal, as a control signal, to the control solenoid 17*a*.

When it is determined that the direction lever 16 is positioned in the neutral position at Step S101, or when it is determined that the state in which the driver is away from the driver seat 21 has not continued for the predetermined period of time at Step S102, the engine stop controller 22 controls the control solenoid 17*a* so that the injector 17 is opened (Step S104). At this time, the engine stop controller 22 outputs an ON signal, as a control signal, to the control solenoid 17*a*.

Figure 4:
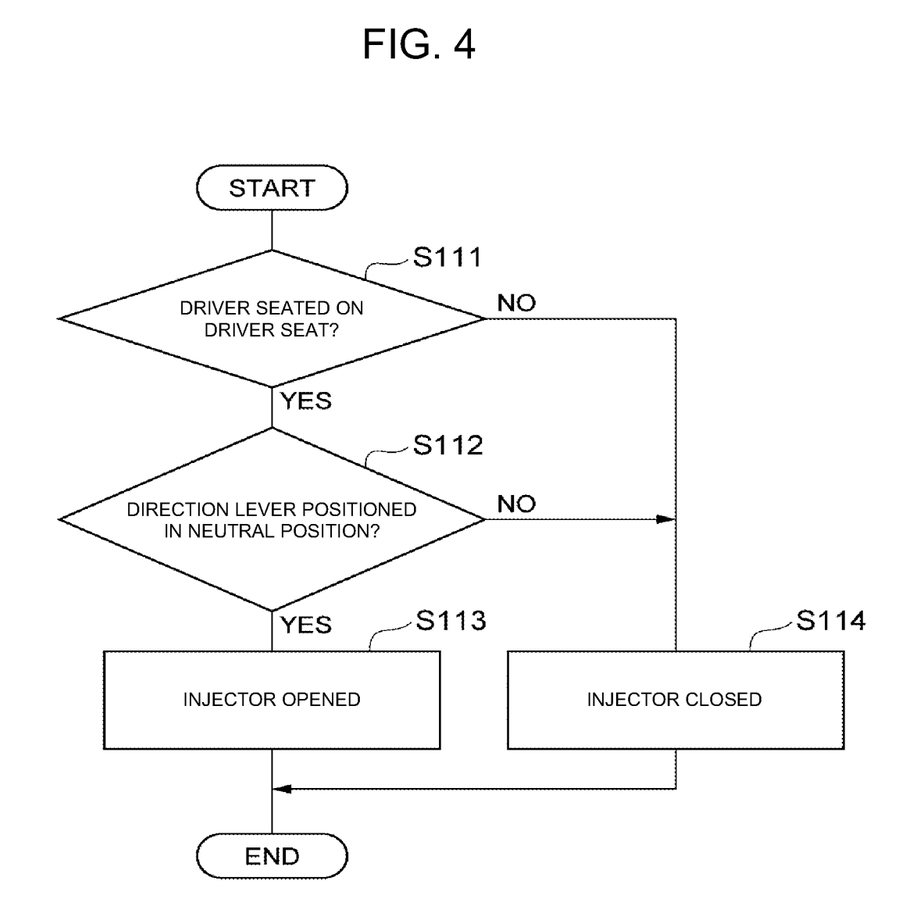
FIG. 4 is a flowchart, showing details of an engine restart control process executed by an engine restart controller illustrated in FIG. 2.

FIG. 4 is a flowchart showing details of an engine restart control process executed by the engine restart controller 23.

In FIG. 4, the engine restart controller 23, firstly, determines whether or not the driver is seated on the driver seat 21 based on the detection signal from the seat switch 18 (Step S111). When it is determined that the driver is seated on the driver seat 21, the engine restart controller 23 determines whether or not the direction lever 16 is positioned in the neutral position, based on the detection signal from the neutral switch 19 (Step S112).

When it is determined that the direction lever 16 is positioned in the neutral position, the engine restart controller 23 controls the control solenoid 17*a* so that the injector 17 is opened (S113). In other words, the engine restart controller 23 controls the injector 17 so as to restart the supply of fuel to the engine 3 when the seat switch 18 determines that the driver is seated on the driver seat 21 and the neutral switch 19 determines that the direction lever 16 is positioned in the neutral position. At this time, the engine stop controller 22 outputs an ON signal, as a control signal, to the control solenoid 17*a*.

When it is determined that the driver is not seated on the driver seat 21 at Step S111, or when it is determined that the direction lever 16 is not positioned in the neutral position at Step 112, the engine restart controller 23 controls the control solenoid 17*a* so that the injector 17 is closed (Step S114). At this time, the engine stop controller 22 outputs an OFF signal, as a control signal, to the control solenoid 17*a*.

In the above, for example, when the driver is away from the driver seat 21 for the predetermined period of time continuously while the forklift 2 travels with the direction lever 16 positioned in a position other than the neutral position, the injector 17 is closed. Since fuel injection from the injector 17 to the engine 3 is stopped, the engine 3 stops, so that the output of the driving force from the engine 3 is stopped. This prevents the forklift 2 from travelling without a driver.

At this time, immediately after the injection of fuel from the injector 17 stops, the engine 3 rotates by inertia and the rotation speed of the engine 3 reduces gradually. As a result, a travel speed of the forklift 2 reduces gradually.

If the driver is seated on the driver seat 21 and operates the direction lever 16 so that the direction lever 16 is switched to the neutral position, before the rotation of the engine 3 stops completely, that is, before the forklift 2 stops travelling completely, the injector 17 is opened. Consequently, the injection of fuel from the injector 17 to the engine 3 is restarted, and the engine 3 is restarted, so that the output of the driving force from the engine 3 is restarted. This allows the forklift 2 to continue to travel.

As has been described, according to the present embodiment, when it is detected that the driver is away from the driver seat 21, the output of the driving force from the engine 3 stops. Then, the engine 3 rotates by inertia, and the rotation speed of the engine 3 reduces gradually. After that, the output of the driving force from the engine 3 restarts once it is detected that the driver is seated on the driver seat 21 and the direction lever 16 is positioned in the neutral position. Therefore, even when the output of the driving force from the engine 3 is stopped with the driver being away from the driver seat 21, the output of the driving force from the engine 3 is restarted if the driver is seated on the driver seat 21 and operates the direction lever 16 to be positioned in the neutral position before the rotation of the engine 3 stops completely. As a result, the hydraulic pump 10 continues to supply hydraulic oil to the power-steering cylinder 11. This allows the power-steering assistance to be provided continuously even if the driver is away from the driver seat 21 temporarily. As a result, the operability of the forklift 2 may be improved.

In addition, the present embodiment allows the output of the driving force from the engine 3 to be stopped or restarted easily and reliably by stopping or restarting a supply of fuel from the injector 17 to the engine 3.

Further, in the present embodiment, the output of the driving force from the engine 3 stops when it is detected that the state in which the driver is away from the driver seat 21 has continued for the predetermined period of time. Therefore, in a case where the driver is away from the driver seat 21 for an extremely short period of time such as the driver reseating themselves on the driver seat 21 or the driver looking in a cargo loaded on the forks (as mentioned above), the output of the driving force from the engine 3 does not stop, so that the workability may be improved.

According to the present embodiment, when the driving force from the engine 3 is not mechanically transmitted to the driving wheels 8 due to the neutral position of the direction lever 16, the output of the driving force from the engine 3 does not stop unnecessarily even when it is detected that the driver is away from the driver seat 21.

Figure 5:
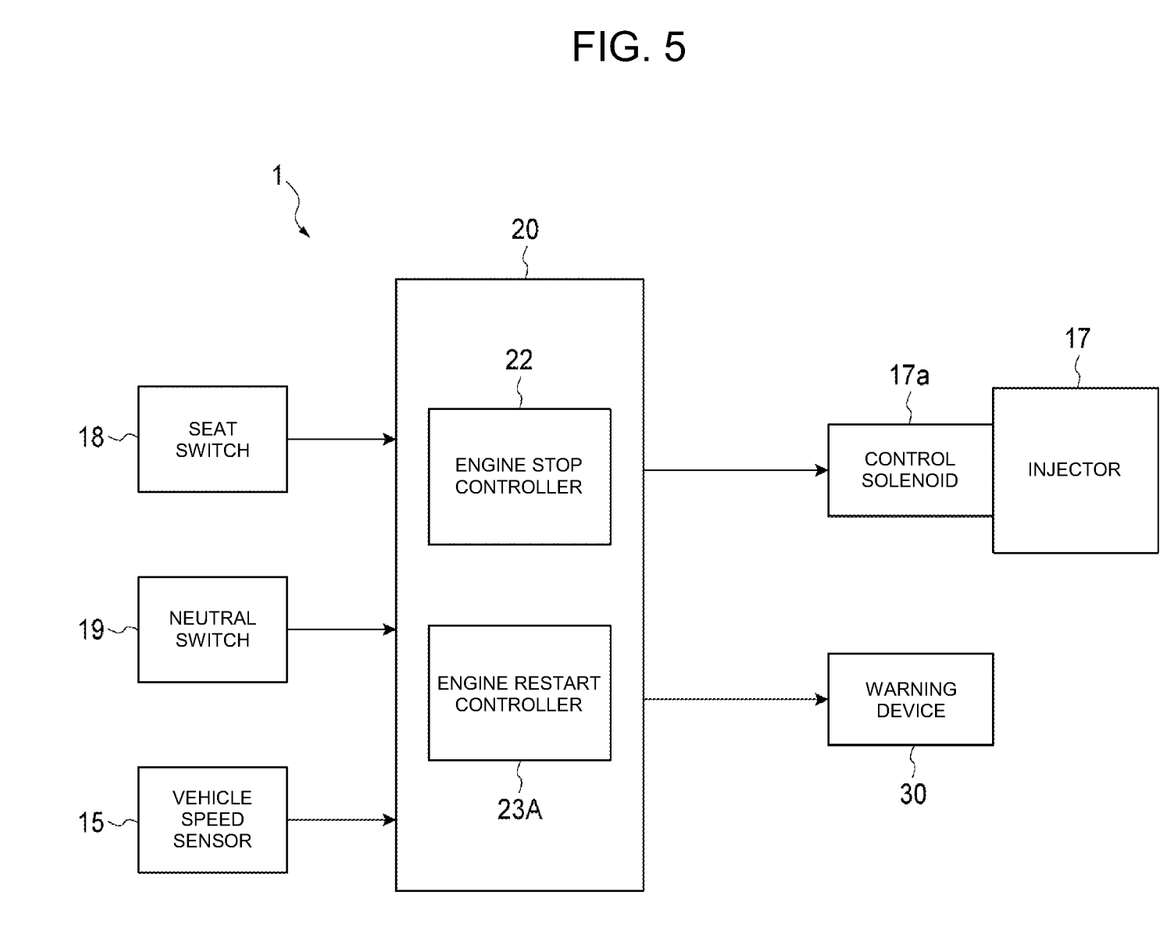
FIG. 5 is a block diagram, illustrating a configuration of a control system of an engine control device according to a second embodiment of the present disclosure.

FIG. 5 is a block diagram illustrating a configuration of a control system of an engine control device according to a second embodiment of the present disclosure. FIG. 5 corresponds to FIG. 2. In FIG. 5, an engine control device 1 of the present embodiment is provided with a warning device 30, in addition to the configuration described in the first embodiment. The warning device 30 may be configured to generate a warning sound such as a buzzer, or to indicate a warning with a lamp, or the like.

In addition, a vehicle controller 20 of the engine control device 1 includes an engine restart controller 23A, in a place of the engine restart controller 23 of the first embodiment.

The engine restart controller 23A controls the control solenoid 17*a* so as to restart fuel injection from the injector 17, in case that the seat switch 18 detects that the driver is seated on the driver seat 21 and the neutral switch 19 detects that the direction lever 16 is positioned in the neutral position after the engine stop controller 22 stops the output of the driving force from the engine 3.

In addition, the engine restart controller 23A issues a warning when the seat switch 18 detects that the driver is seated on the driver seat 21 and the neutral switch 19 detects that the direction lever 16 is positioned in a position other than the neutral position.

Figure 6:
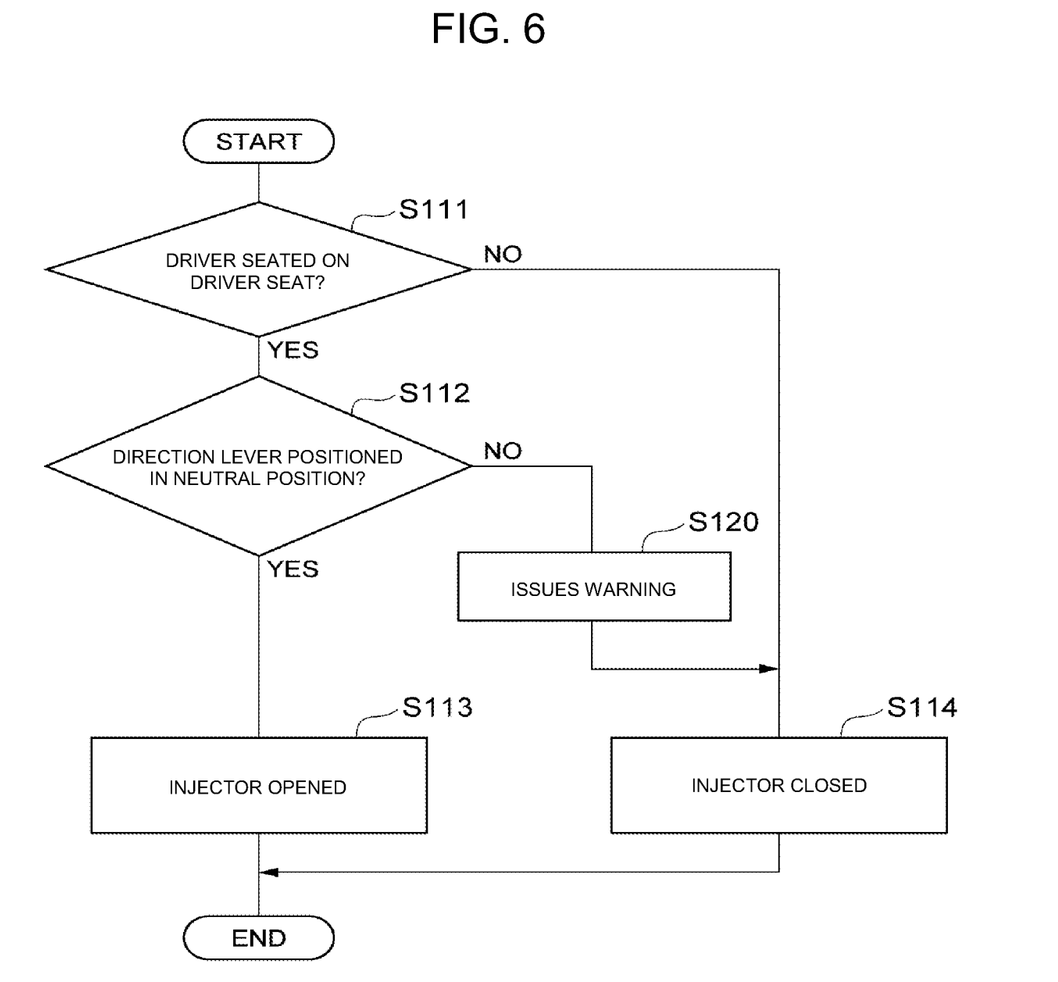
FIG. 6 is a flowchart, showing details of an engine restart control process executed by an engine restart controller illustrated in FIG. 5.

FIG. 6 is a flowchart showing details of an engine restart control process executed by the engine restart controller 23A. FIG. 6 corresponds to FIG. 4.

In FIG. 6, the engine restart controller 23A executes Steps S111 to S113 sequentially, similarly to the engine restart controller 23 of the first embodiment. When it is determined that the direction lever 16 is not positioned at the neutral position (Step S112), the engine restart controller 23A controls the warning device 30 so that the warning device 30 issues a warning (S120).

When it is determined that the driver is not seated on the driver seat 21 at Step S111, or after Step S120 is executed, the engine restart controller 23A controls the control solenoid 17*a* so that the injector 17 is closed (Step S114).

In this way, in the present embodiment, a warning is issued when the driver is seated on the driver seat 21 and the direction lever 16 is positioned in a position other than the neutral position, after the output of the driving force from the engine 3 is stopped. Thus, the driver may be notified that a state in which the output of the driving force from the engine 3 is stopped is continuing. In this case, the output of the driving force from the engine 3 may be restarted by operating the direction lever 16 to be switched to the neutral position by the driver.

Figure 7:
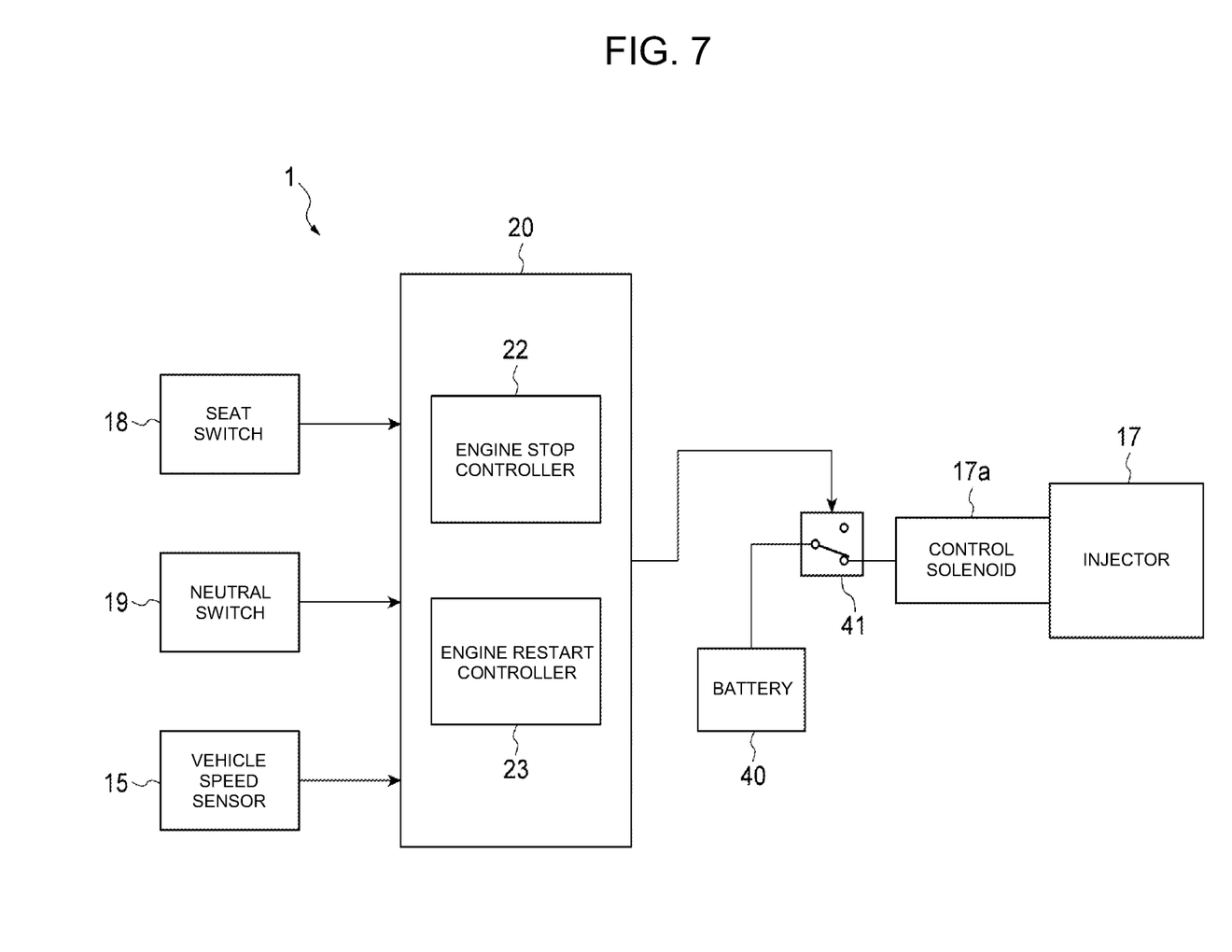
FIG. 7 is a block diagram, illustrating a configuration of a control system of an engine control device according to a third embodiment of the present disclosure.

FIG. 7 is a block diagram, illustrating a control system of a configuration of an engine control device according to a third embodiment of the present disclosure. FIG. 7 corresponds to FIG. 2. In FIG. 7, an engine control device 1 of the present embodiment is provided with a relay 41 disposed between the control solenoid 17*a* of the injector 17 and a battery 40 mounted on the forklift 2.

A b-contact relay in which applying an electric current to a primary side causes a secondary side to be opened is used as the relay 41. A state of the relay 41, i.e., opened or closed, is switched in response to a control signal from the vehicle controller 20. Specifically, when the vehicle controller 20 outputs an OFF signal to the relay 41, the relay 41 is closed, thereby electrically connecting the battery 40 and the control solenoid 17*a*. When the vehicle controller 20 outputs an ON signal to the relay 41, the relay 41 is opened, thereby electrically disconnecting the battery 40 and the control solenoid 17*a*.

The vehicle controller 20 of the engine control device 1 includes an engine stop controller 22 and an engine restart controller 23, similarly to the above-described first embodiment.

The engine stop controller 22 controls the relay 41 so that the injector 17 is closed when it is determined that the direction lever 16 is positioned in a position other than the neutral position and that a state in which the driver is away from the driver seat 21 has continued for the predetermined period of time (see Steps S101 to S103 in FIG. 3). In other words, when the seat switch 18 detects that the driver is away from the driver seat 21, the engine stop controller 22 controls the injector 17 via the relay 41 so as to stop a supply of fuel to the engine 3.

At this time, the engine stop controller 22 outputs an ON signal, as a control signal, to the relay 41. Consequently, the relay 41 is opened, and the control solenoid 17*a* of the injector 17 is turned OFF (in a non-energized state). Since this closes the injector 17, the fuel injection from the injector 17 is stopped.

The engine restart controller 23 controls the relay 41 so that the injector 17 is opened when it is determined that the driver is seated on the driver seat 21 and the direction lever 16 is positioned in the neutral position (see Steps S111 to S113 in FIG. 4). In other words, the engine restart controller 23 controls the injector 17 via the relay 41 so as to restart the supply of fuel to the engine 3 when the seat switch 18 determines that the driver is seated on the driver seat 21 and the neutral switch 19 determines that the direction lever 16 is positioned in the neutral position.

At this time, the engine restart controller 23 outputs an OFF signal, as a control signal, to the relay 41. Consequently, the relay 41 is closed (a state illustrated in FIG. 7), so that the control solenoid 17*a* of the injector 17 is turned ON (in an energized state). Since this opens the injector 17, the fuel injection from the injector 17 is restarted.

In this way, according to the present embodiment, even when the vehicle controller 20 breaks down, the relay 41 is opened and the control solenoid 17*a* of the injector 17 is energized, which allows the injector 17 to supply fuel to the engine 3. In this case, since the stop of the engine 3 is suppressed, the forklift 2 can be moved to a safe place.

It is noted that the present disclosure is not limited to the above-described embodiments. For example, although the output of the driving force from the engine 3 is stopped when it is detected that the driver is away from the driver seat 21 while the forklift 2 travels in the above-described embodiments, the output of the driving force from the engine 3 may be stopped when it is detected that the driver is away from the driver seat 21 while the travelling of the forklift 2 is stopped.

Further, although the injector 17 is controlled so as to be closed when it is detected that the state in which the driver is away from the driver seat 21 has continued for the predetermined period of time in the above-described embodiments, the configuration is not specifically limited thereto, and the injector 17 may be controlled so that the injector 17 is closed at a time at which it is detected that the driver is away from the driver seat 21.

Further, although the injector 17 is controlled so as to be closed when it is detected that the state in which the driver is away from the driver seat 21 has continued for the predetermined period of time while the direction lever 16 is positioned in a position other than the neutral position in the above-described embodiments, the configuration is not specifically limited thereto, and the injector 17 may be controlled so that the injector 17 is closed when it is detected that the driver is away from the driver seat 21 even while the direction lever 16 is positioned in the neutral position.

Further, although the output of the driving force from the engine 3 is stopped or restarted by controlling the injector 17 in the above-described embodiments, the configuration is not specifically limited thereto, and the output of the driving force from the engine 3 may be stopped or restarted by controlling an ignition plug igniting the mixture of fuel and air in the engine 3 or the throttle valve that adjusts the amount of intake air to the engine 3.

Further, although the engine control device 1 of the above-described embodiments are mounted on the forklift 2, the engine control device 1 is applicable to any industrial vehicle such as a towing tractor provided with a power-steering actuator.

REFERENCE SIGNS LIST

1 engine control device
2 forklift (industrial vehicle)
3 engine
10 hydraulic pump
11 power-steering cylinder (power-steering actuator)
16 direction lever (direction operating member)
17 injector (fuel supply member)
18 seat switch (seating detector)
19 neutral switch (neutral detector)
21 driver seat
22 engine stop controller (first controller)
23, 23A engine restart controller (second controller)
30 warning device
40 battery
41 relay

The invention claimed is:

1. An engine control device for a forklift truck in which a power-steering actuator is actuated by hydraulic oil from a hydraulic pump driven by an engine, the engine control device comprising:
    a control valve unit configured to connect the hydraulic pump to the power-steering actuator and control a flow of the hydraulic oil supplied to the power-steering actuator by when the engine is restarted;
    a seating detector configured to detect a seating state of a driver relative to a driver seat of the forklift truck;
    a neutral detector configured to detect whether a direction operating member of the forklift truck is positioned in a neutral position;
    an injector configured to supply a fuel to the engine;
    a first controller configured to stop an output of a driving force from the engine by controlling the injector to close to stop a supply of the fuel to the engine when the seating detector detects that the driver is away from the driver seat; and
    a second controller configured to restart the output of the driving force from the engine by controlling the injector to open to restart the supply of the fuel to the engine to cause the hydraulic pump to continue to supply hydraulic oil to the power-steering cylinder every time that both the seating detector detects that the driver is seated on the driver seat and the neutral detector detects that the direction operating member is positioned in the neutral position during a period between a time at which the first controller stops the output of the driving force from the engine and a time at which a rotation of the engine stops completely.

2. The engine control device for the forklift truck according to claim 1, further comprising
    a relay disposed between the injector and a battery, wherein
    the first controller controls the injector via the relay so as to stop the supply of the fuel to the engine when the seating detector detects that the driver is away from the driver seat, and
    the second controller controls the injector via the relay so as to restart the supply of the fuel to the engine in case that the seating detector detects that the driver is seated on the driver seat and the neutral detector detects that the direction operating member is positioned in the neutral position.

3. The engine control device for the forklift truck according to claim 1, wherein
    the first controller stops the output of the driving force from the engine in case that the seating detector detects that a state in which the driver is away from the driver seat has continued for a predetermined period of time.

4. The engine control device for the forklift truck according to claim 1, wherein
    the second controller issues a warning in case that the seating detector detects that the driver is seated on the driver seat and the neutral detector detects that the direction operating member is positioned in a position other than the neutral position.

* * * * *